April 17, 1945.   A. P. E. PLANIOL   2,374,130
CHARGE FEEDING SYSTEMS FOR INTERNAL-COMBUSTION ENGINES
Filed Oct. 8, 1941
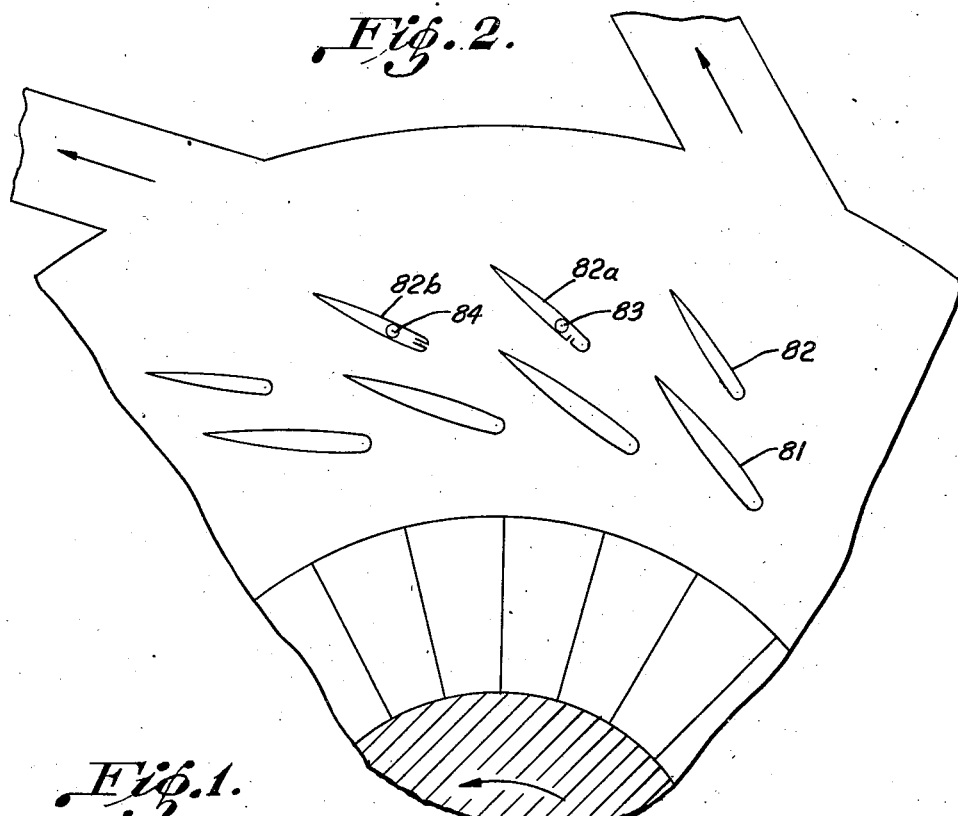
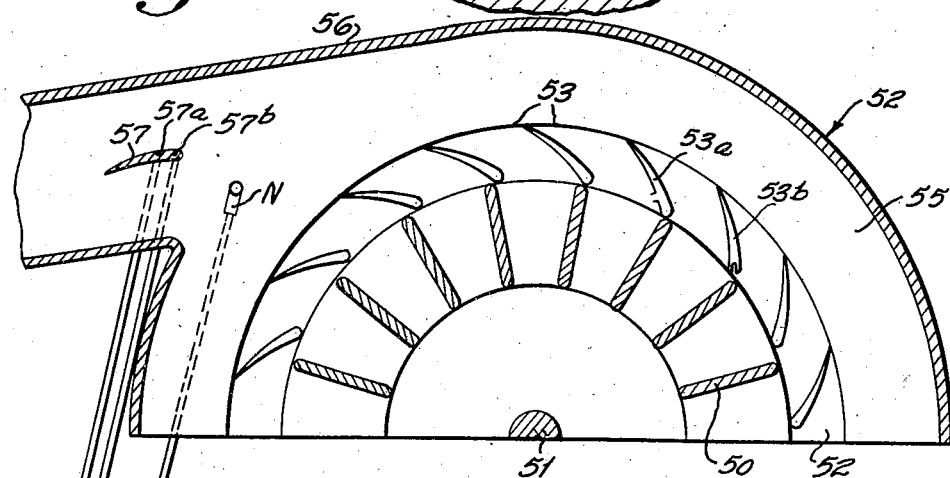
INVENTOR.
ANDRÉ PAUL EUGENE PLANIOL
BY
ATTORNEY.

Patented Apr. 17, 1945

2,374,130

UNITED STATES PATENT OFFICE 2,374,130

CHARGE FEEDING SYSTEM FOR INTERNAL-COMBUSTION ENGINES

André Paul Eugène Planiol, Huntington, N. Y.

Application October 8, 1941, Serial No. 414,056

4 Claims. (Cl. 261—90)

This invention relates to charge feeding for internal combustion engines using carburetors. It is particularly well adapted to engines in which the density and absolute pressure of the feeding air is submitted to wide variations, as it is the case for airplane engines. It must be understood that the invention applies to both supercharged and non-supercharged engines.

The carburetors commonly used with internal combustion engines have, in general, two portions, namely, an air-metering device for determining the amount of air delivered to the engine and a fuel injection device, controlling the amount of fuel delivered to the engine.

One of the most important variables encountered in the operation of the air-metering device is the volume of air admitted to the engine, generally measured by the ram of the air flow passing through the metering device, i. e., the difference in the static and total pressures between two points. If the air density remains approximately constant, the volume of the air is the only controlling variable. This is the case, generally, for automobile engines which are used at ground level. However, of the density of the air varies between wide limits, for example, under the conditions of use of airplane engines, the metering device is more complicated and generally includes thermometers or manometers, for example, acting to compensate for variations in the density and the temperature of the air. In all cases, however, the rate of flow of air must be sufficiently great to cause operation of the injection device, through the variations of pressure resulting from the flow which are transmitted by the air-metering device to the fuel injection device.

To obtain the necessary velocity, the carburetors which are now in use are usually provided with throat portions or venturi of restricted area in which the air flows at very high speed. Even if this high speed is partially recovered by a device like a venturi, a considerable pressure drop always occurs and results unavoidably in a decrease in the power output of the engine, inasmuch as the power output is approximately proportional to the absolute pressure of the air feeding the engine.

This drop of pressure is generally small for engines used at ground level, for example, some few percent of the total pressure in the inlet manifold. However, in airplane engines adapted to be used at very high altitudes, this drop of pressure may become extremely important. For example, with a constant weight of air flowing through the venturi which has a constant cross-sectional area, the pressure drop is inversely proportional to the density of the air. At very high altitude, this pressure drop may be, for instance, three or four times what it is at ground level. Correspondingly, the absolute atmospheric pressure may fall to one-fourth or one-fifth of what it was at ground level. This means that in order to obtain a given pressure on the pressure side of a supercharger, the amount of power required by the supercharger must be increased due to the pressure drop through the carburetor at high altitudes. Moreover, under these conditions of operation, the air temperature at the outlet of the supercharger becomes so high that a proper feeding of the engine is no longer possible.

In accordance with the present invention, the pressure difference which is required for controlling the operation of the injection device is obtained by accelerating only a small portion of the air flow instead of the totality. Thus the total losses of energy are extremely small inasmuch as it is necessary to obtain in only a small proportion of the air drawn into the engine a speed equivalent to the speed obtained for all of the air in the restricted section of a normal carburetor.

Accordingly, carburetion systems embodying the present invention eliminate restricted sections through which all of the air must flow and this is accomplished by placing in a suitable zone in the path of flow of the air delivered to the engine, one or more devices capable of producing locally a speed greater than the average speed of the air flow in the zone of their location. The difference in pressure thus created in these localized areas or zone is high enough to control the operation of the fuel injection device.

The localized zones of increased air speed may be produced by means of airfoils or other aerodynamic cross-sectional shapes which give high local speeds with little obstruction of the air flow and thereby create a pressure differential which is sufficient to control the operation of the fuel injection system.

For example, when a wing or airfoil profile is in the air flow and is put at an angle giving an appreciable lift coefficient, a conduit in the leading edge of the profile will receive air at a pressure equal to the static pressure plus the ram or $Ps + \frac{1}{2}\rho V^2$.

The pressure exerted the air on a second conduit, in the back of the profile not far from the leading edge will be equal to approximately $$Ps - 2\rho \frac{V^2}{2}$$

or even more. Thus the difference in pressure in two conduits can reach 3 or $$4\rho \frac{V^2}{2}$$

These pressure differentials, which are a measure of the velocity and the volume of the air may be used to regulate the amount of fuel that is fed into the air stream and thence to the engine, following the well known technique now in use in modern carburetors. In the particular case of supercharged engines, such airfoils may be located in many different relationships to the supercharger. For example, one or more small airfoils forming the air-metering device may be located either in the inlet duct or scroll of a supercharger, or on the pressure side of the supercharger. The fuel injection means may be located on the intake or on the pressure side of the supercharger. For example, the metering device and the injection device may be on the same or on opposite sides of the supercharger. Preferably the metering device is located in the air stream where there is a continuous, non-pulsating flow of the air. Therefore, in the case of V-type engines, for example, the air-metering device or devices may be located in the straight pipes leading to the two banks of cylinders. With radial engines in which the several cylinders are connected by separate pipes to the header on the pressure side of the supercharger, the air-metering device or devices may be located at the intake side of the supercharger, or in a zone at the pressure side where uniform speeds of air flow are maintained.

As indicated above, supercharged carburetion systems of the type embodying the invention minimizes the amount of power required to drive the supercharger for given atmospheric pressure and engine manifold pressure, while at the same time permitting the carburetion of very large volumes of air with a minimum of energy losses and at all times assuring the proper feed of both air and fuel to the engine.

For a better understanding of the present invention, reference may be had to the accompanying drawing in which:

Figure 1 is a view in cross-section of a supercharger disclosing the air-metering device in the outlet duct thereof, and Figure 2 is a particular case of application of the invention to a Szydlowski-Planiol supercharger feeding a radial engine.

The form of supercharger illustrated in Fig. 1 of the drawing is similar to that disclosed in the Szydlowski-Planiol Patent No. 2,210,155 issued August 6, 1941. It must be clearly understood that the invention may be used with every type of engine without or with superchargers. If a supercharger is employed it is not necessarily one of the Szydlowski-Planiol type. The following description is only a non-restrictive example of one among many possible applications of the new invention.

Illustrative of the invention and as shown in Figure 1, the metering means may be located in the outlet duct of a supercharger, of the type disclosed in the Szydlowski-Planiol Patent No. 2,210,155 or conventional design the last being shown in this form of device. The supercharger impeller 50 may be rotatably supported by a shaft 51 within a casing 52 which has adjacent the periphery of the impeller 50 a set of diffusing vanes of airfoil section 53. The set of vanes 53 are interposed between the periphery of the impeller 50 and a header 55 from which the air is delivered by an outlet duct 56. The metering device embodying the invention may consist of an airfoil 57 which extends substantially diametrically across the outlet duct 56. The pressure differential conduits 57a, 57b extend longitudinally of the vane 57 from one wall of the outlet duct 56 and communicate by means of small apertures, respectively, with the outlet duct 56 rearwardly of the leading edge of the vane 57 and at its leading edge respectively. With this construction, the passage of the air over the vane will create the necessary pressure differential to operate the fuel injecting means A, shown diagrammatically, which directs fuel into the air stream at any desired point, by means of a nozzle N, causing it to mix with the air to be fed into the cylinders of the engine.

If instead of a single outlet duct 56, a plurality of outlet ducts are provided for feeding a radial engine, one or more of the diffuser air-foils 53a and 53b, for example, may be used as a metering device by providing it with pressure differential measuring conduits similar to airfoil 57, instead of using a special profile, as explained above.

For this purpose, it is only necessary to drill a hole, in one or more of these vanes, which opens in a suitably chosen part of the profile and thus gives the necessary pressure difference to activate the injection device. The pressure difference is transmitted from the profile to the injection device through suitable tubes. This particular form is disclosed more particularly in Figure 2, which discloses a supercharger of the type disclosed in Patent No. 2,210,155 for feeding a radial engine. For example, in this figure, it has been supposed that the diffuser has two rings of diffuser vane airfoils 81 and 82. Two vanes 82a and 82b of the outer ring are used. They are hollow and send the indications to the injection device through the tubes 83 and 84 as previously described. If the air foils 53 (Figure 1) or 81 and 82 (Figure 2) are made hollow to receive a cooling fluid as suggested in the R. Planiol application Serial No. 396,128, filed May 31, 1941, one or more of these airfoils may be sealed against entrance of the cooling fluid and used as the metering device or devices as described above.

It will be understood that, in the case of more than one annular ring of profiles are successively crossed by the gas flow, the profiles used as metering devices may be, following the specific requirements of each particular case, in the internal ring or in one of the other or in a plurality of rings.

It will be understood from the preceding description that the primary purpose of the present invention is to provide a metering means in which the drop of pressure in the feeding air will be minimized and hence will have a minimum of effect upon the power output operation of the engine, and in which the flow of air is largely unrestricted so that the air can be supplied to the engine with maximum efficiency.

It will be understood, moreover, that the form and location of the air-metering devices and fuel measuring feeding and injecting devices may be varied considerably, as indicated by the above-described forms of the invention and the size and shape of the parts may be varied widely so long as the metering vanes form only a minor proportion of the cross-sectional area of the air flow lines. Therefore, it will be apparent from the foregoing that the above-described embodiments of the invention should be considered as illustrative only and not as limiting the scope of the following claims.

I claim:

1. A charge feeding system for internal combustion engines comprising a supercharger having a casing, an impeller in said casing and inlet and outlet ducts free from zones of restricted area capable of changing the velocity of the air stream as a whole communicating with said housing, means for introducing fuel into said supercharger and a metering member for regulating the introduction of fuel in one of said ducts having an airfoil cross-section having a leading edge facing in a direction opposite to the direction of flow of the air in said one of said ducts and separate passages subject to different air pressures opening to the surface of said member, one of said passages being adjacent to said leading edge and the other passage being spaced from said leading edge, said air pressures in said passageways controlling operation of said fuel introducing means, said member having a transverse cross-section equal to only a minor portion of the area of said one of said ducts, so that the velocity of the main portion of the air stream is substantially unaffected thereby.

2. A charge feeding system for internal combustion engines comprising a supercharger having a casing, an impeller in said casing and air inlet and outlet ducts communicating with said casing, an air-metering member of airfoil cross-section mounted in said supercharger with its leading edge directed substantially opposite to the direction of flow of said air, a fuel inlet passage in said supercharger, and means responsive to differential pressures exerted on said metering member by flow of air thereover for controlling the amount of fuel injected into said supercharger.

3. A charge feeding system for internal combustion engines comprising a supercharger having a casing, an impeller in said casing and air inlet and outlet ducts communicating with said casing, an air-metering member of airfoil cross-section mounted in said outlet duct with its leading edge directed substantially opposite to the direction of flow of said air, a fuel inlet passage in said inlet duct, and means responsive to differentials in air pressures exerted on different parts of said member by flow of air thereover for controlling the amount of fuel introduced through said fuel inlet passage.

4. A charge feeding system for internal combustion engines comprising a supercharger having a casing, an impeller in said casing, air diffuser vanes on the pressure side of said impeller, fuel introducing means in said casing and a plurality of passageways in at least one of said diffuser vanes communicating with the interior of said casing at different zones on the periphery of said vanes and subjected to different air pressures created by passage of air over said one of said vanes for controlling the amount of fuel introduced into said casing.

ANDRÉ PAUL EUGÈNE PLANIOL.